(12) United States Patent
Boczkowski et al.

(10) Patent No.: US 10,471,661 B2
(45) Date of Patent: Nov. 12, 2019

(54) APPARATUS AND SYSTEM FOR ELECTRO-FUSION OF POLYETHYLENE PIPELINE

(71) Applicant: SHAWCOR LTD., Toronto (CA)

(72) Inventors: Pawel Boczkowski, Mississauga (CA); Mark Brandon, Toronto (CA); Jeremy Joseph Ellis, Toronto (CA); Dilip Tailor, Mississauga (CA); Pascal Laferriere, Toronto (CA)

(73) Assignee: Shawcor, Ltd., Toronto (CA)

( * ) Notice: Subject to any disclaimer, the term of this patent is extended or adjusted under 35 U.S.C. 154(b) by 210 days.

(21) Appl. No.: 15/521,012

(22) PCT Filed: Oct. 22, 2015

(86) PCT No.: PCT/CA2015/051073
§ 371 (c)(1),
(2) Date: Apr. 21, 2017

(87) PCT Pub. No.: WO2016/061691
PCT Pub. Date: Apr. 28, 2016

(65) Prior Publication Data
US 2018/0022036 A1 Jan. 25, 2018

Related U.S. Application Data

(60) Provisional application No. 62/068,380, filed on Oct. 24, 2014.

(51) Int. Cl.
*B29C 65/34* (2006.01)
*B29C 65/50* (2006.01)
(Continued)

(52) U.S. Cl.
CPC ........ *B29C 65/344* (2013.01); *B29C 65/5042* (2013.01); *B29C 66/5221* (2013.01); *B29K 2023/06* (2013.01); *B29L 2023/22* (2013.01)

(58) Field of Classification Search
CPC .............. B29C 65/344; B29C 65/3468; B29C 65/3476; B29C 65/5042; B29C 65/5057; B29C 65/72
See application file for complete search history.

(56) References Cited

U.S. PATENT DOCUMENTS 3,133,846 A * 5/1964 Gandy .................... B29C 65/18
156/273.9
2006/0037955 A1* 2/2006 Gueugnaut ........... B29B 13/024
219/535

(Continued)

FOREIGN PATENT DOCUMENTS

| CA | 2329215 A1 | 10/1999 |
| CA | 2704406 A1 | 11/2011 |
| WO | 1996038288 A1 | 12/1996 |

OTHER PUBLICATIONS

PCT Search Report & Written Opinion (PCT/CA2015/051073), dated Feb. 3, 3016.

*Primary Examiner* — Jeffry H Aftergut
*Assistant Examiner* — Jaeyun Lee
(74) *Attorney, Agent, or Firm* — Gregory L. Porter; Hunton Andrews Kurth LLP

(57) ABSTRACT

A method for forming a connection between two tubular sections having a polymeric outer surface jacket, using electrofusion to fusion bond a casing of similar, non-crosslinked polymer to the outer surface of the tubular sections.

11 Claims, 8 Drawing Sheets

(51) Int. Cl.
   *B29C 65/00*   (2006.01)
   *B29L 23/00*   (2006.01)

(56) References Cited

U.S. PATENT DOCUMENTS

| | | | | |
|---|---|---|---|---|
| 2012/0223452 A1* | 9/2012 | Tailor | ................. | B29C 44/1242 264/46.9 |
| 2013/0228265 A1* | 9/2013 | Tailor | ................... | F16L 13/004 156/86 |
| 2013/0285366 A1* | 10/2013 | Tailor | ................. | B29C 65/3668 285/21.2 |

* cited by examiner

APPARATUS AND SYSTEM FOR ELECTRO-FUSION OF POLYETHYLENE PIPELINE

FIELD OF THE INVENTION

The present invention relates to a method for forming a connection between two tubular sections having a polymeric outer surface jacket. The method utilizes electrofusion to bond a casing to the polymeric outer surface jacket of the tubular sections. The bond may be of a casing of a single layer of non-crosslinked polymer, or may be of an inner layer of a two (or more) layer polymer casing comprising an outer, cross-linked polymer layer.

BACKGROUND OF THE INVENTION

Pre-insulated pipeline is fabricated by putting together lengths of manufactured pipe. The pipe lengths are manufactured in various diameters and lengths, and are typically steel pipe, optionally epoxy coated, covered with a layer of foam insulation, then covered with a polymeric outer surface jacket. The metal pipe is exposed at the two ends of the pipe length, along a defined length of pipe. One exposed length of the metal pipe is girth welded to the end of the pipeline, forming a cut-back region of bare steel pipe, having at its centre a girth weld, and surrounded on both sides by the foam insulation and polymeric outer surface jacket. Ideally, a pipeline should have continuous insulation and outer polymer jacket layers, so the cut-back region is filled using a variety of different methods and means. Typically, a casing of polymer is attached to the outer polymer jacket layer on both ends of the cut-back region, and injection filled with foam insulation.

Attachment of the polymer casing to the outer polymer jacket is typically done in one of three methods: electrofusion, induction fusion, or adhesively bonding of the inner layer of the polymer casing to the outer layer of the polymer jacket.

Certain methods of electrofusing a casing to a field joint are well known in the art. For example, U.S. Pat. No. 4,629,216 published Dec. 16, 1986 and incorporated herein by reference, describes non-shrink plastic casings and employs electric heating elements to form a bond between the plastic casing and the plastic jacket of preinsulated pipes. U.S. Pat. No. 4,866,252, published Sep. 12, 1989 and incorporated herein by reference, discloses a connection between preinsulated pipes having a casing and sleeve articles, one disposed over each end of the casing where it overlaps the jacket of the preinsulated pipe. The articles have a bonding material that will form a fusion bond to the jacket, an outer heat shrink layer and a built in electrical heating element in contact with the heat shrink layer for heating and shrinking the outer layer. Since the heat flux from the built in heating element is relatively small, the heat shrink layers are made thin to permit heat penetration and shrinking of the heat shrink layer, and according to the patent the thickness of the article before heat shrinking may be up to 6 mm. The article is less useful where thicker casing members are desired for use with large diameter preinsulated pipes. Use of electric heating elements for binding casings is also described in the Mounting Instructions for the Electric Welder for BelmaFlex Welding Joints (BelmaFlex, Farsø, Denmark). The BelmaFlex casing system comprises a welding band which is a heating element, fitted to the outer surface jacket of the pipe on each end of the pipe joint. A casing is then slid over the pipe joint, and the ends of the casing are heat shrunk to the outer surface jackets on each end of the pipe joint. Once the casing has cooled, buckles are placed around the heat shrunk sections, and current is applied to the welding band, through electrical connections connected to the welding band and extending beyond the casing, between the casing and the outer surface jacket. The application of electric current causes the welding band to heat, which melts and fuses the casing to the outer surface jacket. The casing is then drilled, foam insulation is injected into the drill holes to fill the gap between the casing and the exposed pipe joint, and the drill holes are capped.

Some of the present inventors have also disclosed various methods for electrofusing of a casing member to a cut-back region of a preinsulated pipeline, and casing members for use in those methods, for example, in PCT publication WO 2011/143733, incorporated herein by reference. Generally, the casing members have a first, cross-linked, heat shrinkable outer layer, and a second, inner, non-crosslinked (or less cross-linked) layer. The casing members have an electrically heatable member spaced inwardly from the first layer, for fusion bonding the second layer to the tubular sections.

In use, when the first layer of the casing member is heat shrunk, in one preferred form it applies a hoop stress to the second layer. When the second layer is heated with the electrically heatable members, in a preferred form, a fusion bond is created between the material of the second layer and of the outer surface of the tubular section. A fusion bond is created when two compatible plastics materials melt and fuse together under fusion or welding conditions. A fusion bond results in a continuously homogeneously weld portion. The above-mentioned hoop stress facilitates formation of the fusion bond.

The WO 2011/143733 publication further describes the use of an electrically heatable member as a particularly effective and convenient way of heating the second layer and the tubular section surface substrate to create the fusion bond. The electrically heatable member, may for example, be in the form of electrical resistance heating elements or electrically inductively heatable elements which may be disposed inwardly from the second layer, or may be disposed integrally within the second layer.

Generally, a proper electrofusion of two surfaces has excellent mechanical properties and is difficult to unattach. However, some prior art electrofusion methods have been criticized as sub-optimal for water penetration of the seal.

A known alternative method to electrofusion is to bond the outer polymer surface layer of the pipe to the casing using an adhesive. Typically, the adhesive is in the form of an inner layer of the casing. In some methods, the adhesive is a liquid adhesive which is applied to the outer polymer surface layer or to the inside of the casing (or to both). In most instances the adhesive must be heated to bond to at least one of the two surfaces. While adhesive-based methods are very well known and used with much success, some adhesive-based methods are criticized for less than optimal mechanical properties, and are known to detach with time and/or application of external environmental factors.

SUMMARY OF THE INVENTION

According to one aspect of the present invention is provided a method of attaching a casing to an outer surface jacket of a pipeline at a pipe joint, comprising: wrapping or fitting a heat shrinkable casing around the pipe joint so that a side portion of the casing overlaps the end portion of the outer surface jacket on either side of the pipe joint, to form an interface region on each side of the pipe joint, said interface region defined as being between the end portion of the outer surface jacket and the side portion of the casing; said interface region, end portion, and/or side portion having an electric heating element around its circumference; and wrapping an adhesive tape around said side portions to provide pressure between the side portions and the end portions at the interface region; applying an electric current to said electric heating element of a sufficient energy to heat said electric heating element to a temperature sufficient to fuse said side portions to said end portions.

In certain embodiments, the electric heating element is wrapped around the end portion of the outer surface jacket prior to wrapping or fitting the casing around the pipe joint.

According to certain embodiments, the casing is heat shrinkable and at least the side portions of the casing are heat shrunk before the wrapping step.

In certain embodiments, the adhesive tape having an adhesive providing stickiness at room temperature and which stays adhesive to a temperature of at least 240° C.

According to a further aspect of the invention is provided a method of attaching a casing to an outer surface jacket of a pipeline at a pipe joint, comprising: wrapping or fitting a casing around the pipe joint so that a side portion of the casing overlaps an end portion of the outer surface jacket on either side of the pipe joint, to form an interface region on each side of the pipe joint, said interface region defined as being between the end portion of the outer surface jacket and the side portion of the casing; said interface region, end portion, and/or side portion having both an electric heating element and an adhesive strip around its circumference; and applying an electric current to said electric heating element of a sufficient energy to heat said electric heating element to a temperature sufficient to fuse said side portions to said end portions.

In certain embodiments, heat is applied to the side portion of the casing to melt the adhesive strip, resulting in a bonding of the outer surface jacket to the casing.

According to a further aspect of the invention is provided a method of attaching a casing to an outer surface jacket of a pipeline at a pipe joint, comprising: wrapping or fitting a casing around the pipe joint so that a side portion of the casing overlaps an end portion of the outer surface jacket on either side of the pipe joint, to form an interface region on each side of the pipe joint, said interface region defined as being between the end portion of the outer surface jacket and the side portion of the casing; said interface region, end portion, and/or side portion having an electric heating element around its circumference; applying a first electric current to said electric heating element, said first electric current of insufficient energy to fuse said side portions to said end portions, but of sufficient energy to warm and render more uniform a temperature of the heating element; and applying a second electric current to said electric heating element of a sufficient energy to heat said electric heating element to a temperature sufficient to fuse said side portions to said end portions.

According to a further aspect of the present invention is provided a heating element for use in electrofusing a casing to an outer surface jacket of a pipeline at a pipe joint, said heating element comprising: a wire mesh body and two ends, said body of sufficient length and flexibility to be capable of snugly wrapping around a circumference of said outer surface jacket in a manner that the two ends are proximate to one another but not touching; each of said two ends having a labyrinth configuration and a lead extending therefrom for connection to a power source.

According to a further aspect of the present invention is provided a spacer for use in conjunction with a heating element for use in electrofusing a casing to an outer surface jacket of a pipeline at a pipe joint, said heating element comprising a wire mesh body and two ends, said body of sufficient length and flexibility to be capable of snugly wrapping around a circumference of said outer surface jacket in a manner that the two ends are proximate to one another but not touching; each of said two ends having a lead extending therefrom for connection to a power source; said spacer capable of holding the two ends at a desired distance; said spacer comprising: a gap region of a width of about the desired distance and a height equal or greater than the height of the ends; and two tongues, each extending from opposing sides of said gap region and having a height that is less than said gap region; each tongue having at least one button extending therefrom to a height equal or greater than the height of the ends, said button of a shape, size and configuration that it is capable of extend into a hole in the wire mesh when said wire mesh is placed on top of said tongue.

According to a further aspect of the present invention is provided a spacer for use in accurately positioning a thermocouple proximal to a heating element for use in electrofusing a casing to an outer surface jacket of a pipeline at a pipe joint, said heating element comprising a wire mesh body and two ends, said body of sufficient length and flexibility to be capable of snugly wrapping around a circumference of said outer surface jacket in a manner that the two ends are proximate to one another but not touching; each of said two ends having a lead extending therefrom for connection to a power source; said spacer capable of accurately positioning a thermocouple proximal to a heating element, said spacer comprising: a backing; a plurality of buttons extending from said backing, each of which being of a shape, size and configuration that it is capable of extending into a hole in the wire mesh when said wire mesh is placed on top of said backing; a channel within the backing, of a diameter similar to the diameter of a thermocouple probe; said channel having an aperture at one end for receiving a thermocouple probe and a stopper at an opposing end for stopping movement of said thermocouple probe beyond said channel.

BRIEF DESCRIPTION OF THE FIGURES

The invention will be more fully described by way of example only with reference to the accompanying drawings.

DETAILED DESCRIPTION

Figure 1:
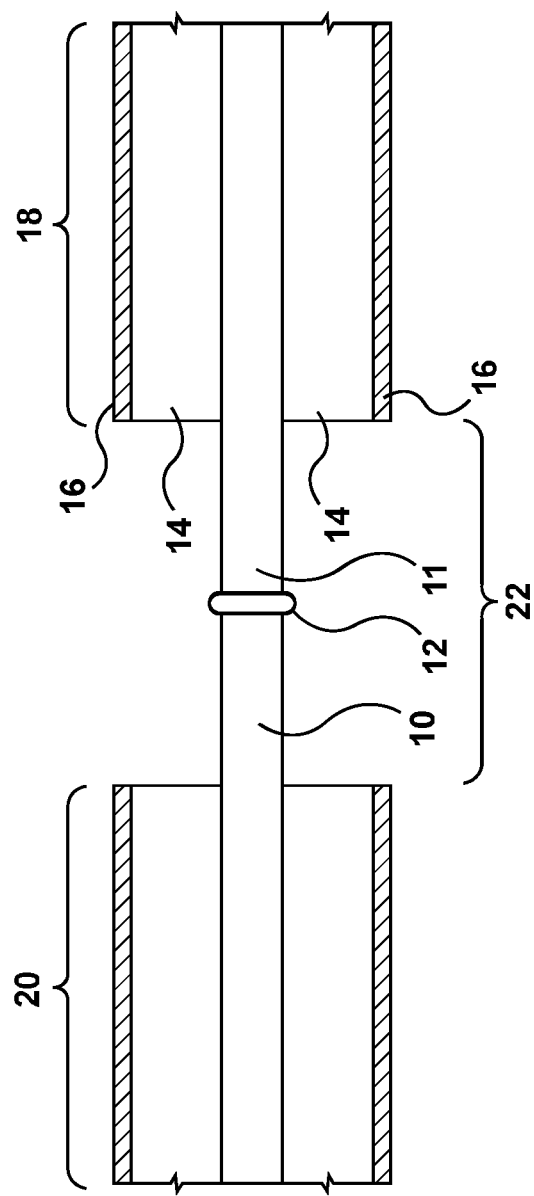
FIG. 1 shows a schematic view of a cross section of a cut-back region of a pre-insulated pipeline, as known in the prior art.

FIG. 1 shows a somewhat schematic view of a cross section of a cut-back region of a preinsulated pipeline, as known in the prior art. The region comprises steel pipe 10, which has been girth welded to the end of the pipeline 11 at a girth weld 12. Both the pipe 10 and the pipeline 11 are encased in an insulation layer 14, which in turn is encased in outer surface jacket 16, which is typically a polyolefin layer which provides structural strength and water resistance.

The pipeline region 18 is connected to the pipe region 20, leaving a cut-back region 22 which is bare steel, which does not comprise insulation or polyolefin jacket layers.

Figure 2:
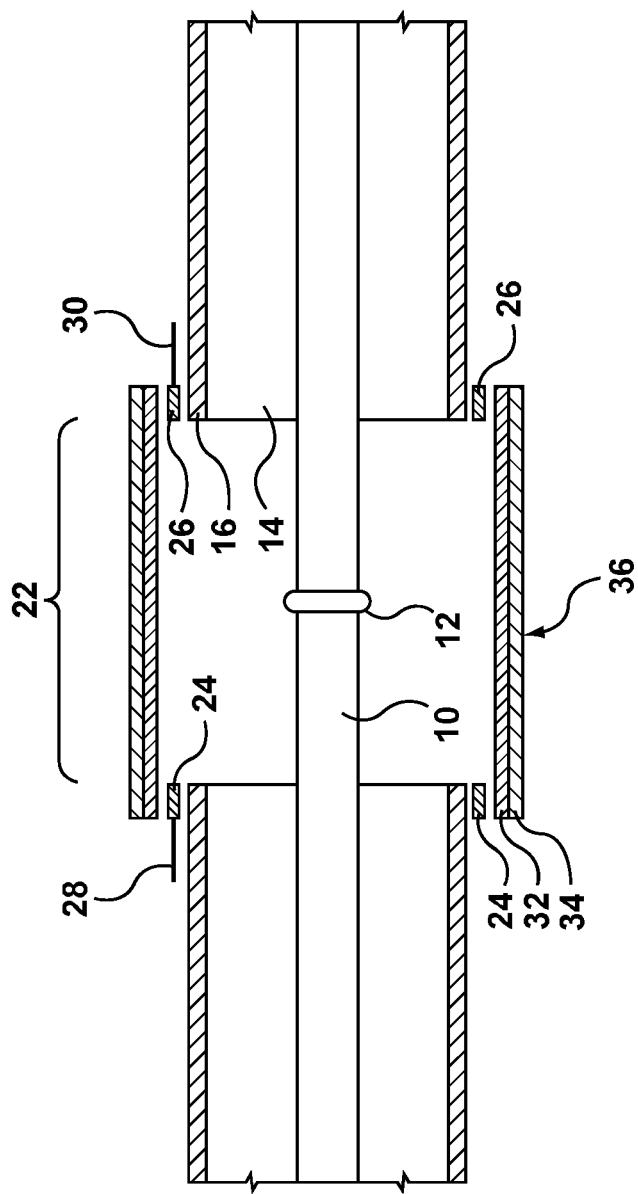
FIG. 2 shows a somewhat schematic view of a cross section of a cut-back region of a preinsulated pipeline, having a casing attached thereto.

FIG. 2 shows a prior art casing 36 placed on the cut-back region 22. As shown, the casing 36 comprises two layers: an outer casing layer 34, which is cross-linked and heat shrinkable, and an inner casing layer 32, which is not cross-linked, or alternatively is less cross-linked than the outer casing layer 34. Shown are heating elements 24, 26, each having electrical connector leads 28, 30, respectively. The heating elements 24, 26 are typically bands or meshes of copper or another resistive metal. An electrical current (not shown) is applied to the heating elements 24, 26, which is converted to heat by the resistance properties of the heating elements 24, 26. The heat is of a sufficient energy to melt a portion of the outer surface jacket 16 and a portion of the inner casing layer 32, to fuse the two layers together. As would be understood by a person of skill in the art, the polymer of the inner casing layer 32 and of the outer surface jacket 16 are selected to be compatible and fusable together with the presence of sufficient heat. It is noted that in typical methodology, the heating elements 24, 26 are incorporated within the joint and not removed after fusion.

It has been found that it is desirable to maintain a certain amount of hoop stress in the casing 36, most particularly at the ends of the casing 36 which are to be fused. The hoop stress significantly enhances the fusing process. In prior art methods, as described in WO 2011/143733, this hoop stress is created by utilizing a heat-shrinkable outer casing layer, and heat shrinking said outer casing layer before electrofusion takes place. Thus, the method has two main steps—a heating step where the ends of casing 36 are heat shrunk to the outer surface layer 16, and an electrofusion step, where electricity is passed through heating elements 24, 26, fusing the casing to the outer surface layer 16.

Figure 3:
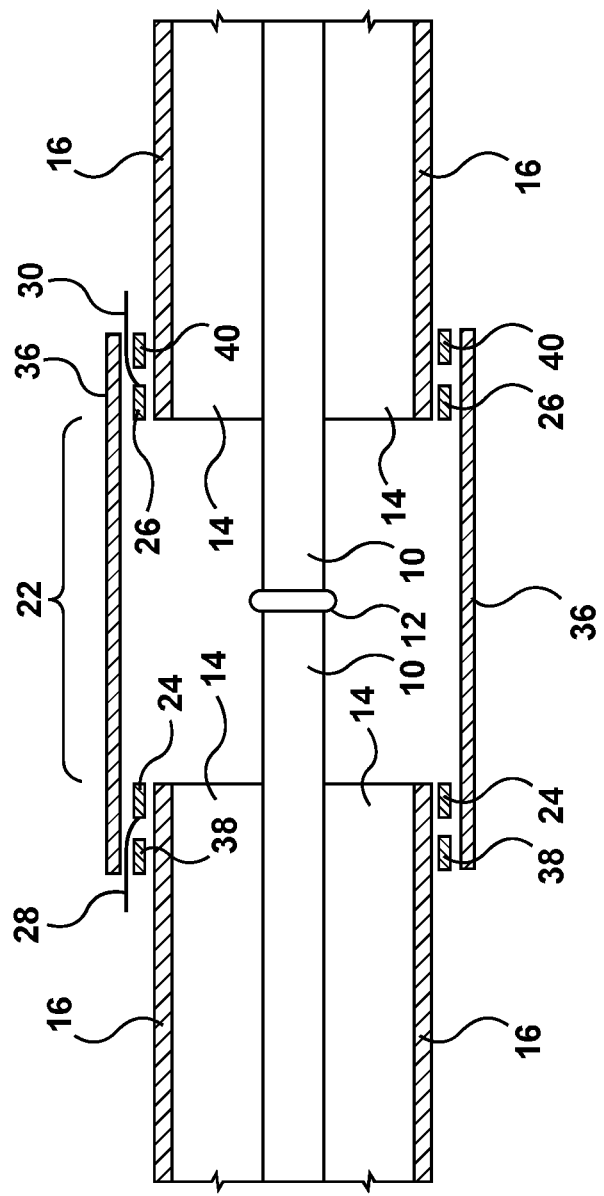
FIG. 3 shows a somewhat schematic view of a cross section of a cutback region, with a casing applied thereto according to the present invention.

FIG. 3 shows a somewhat schematic cross-section of one embodiment of a method of applying a casing to a cut-back region of a pipeline according to the present invention. Like in prior art method of FIG. 2, the casing 36 is fitted to the cut-back region 22; heating elements 24, 26 are fed electricity through leads 28, 30 to electrofuse the inner surface of the casing 36 to the outer surface of the outer surface layer 16. However, in this embodiment, the method also comprises a further step. An adhesive strip 38, 40 is applied to one of the outer surface of the outer surface layer 16 or the inner surface of the casing 36, before application of the casing 36 to the cut-back region 22. Thus the casing 36 is bonded to the outer surface layer 16 twice on each side of the cut-back region—a first electrofusion bond as previously described, and an adhesive bond distal to the cut-back region 22 relative to the electrofusion bond. The electrofusion bond provides structural strength and integrity to the bond, whereas the adhesive bond provides a better prevention of water penetration. The use of the two bonds, side by side, also provides a certain degree of redundancy and a greater overall strength to the casing-outer surface jacket bond.

Heating elements 24, 26 may be, for example in the form of resistively heatable wire, rods, wire mesh or netting in a tape form, or electric wire or flat metallic strip coated with a polymer compatible with the fusion bonding of the casing second layers to the pipe jackets, for example polyethylene. In preferable embodiments, heating elements 24, 26 are a wire mesh.

Figure 4:
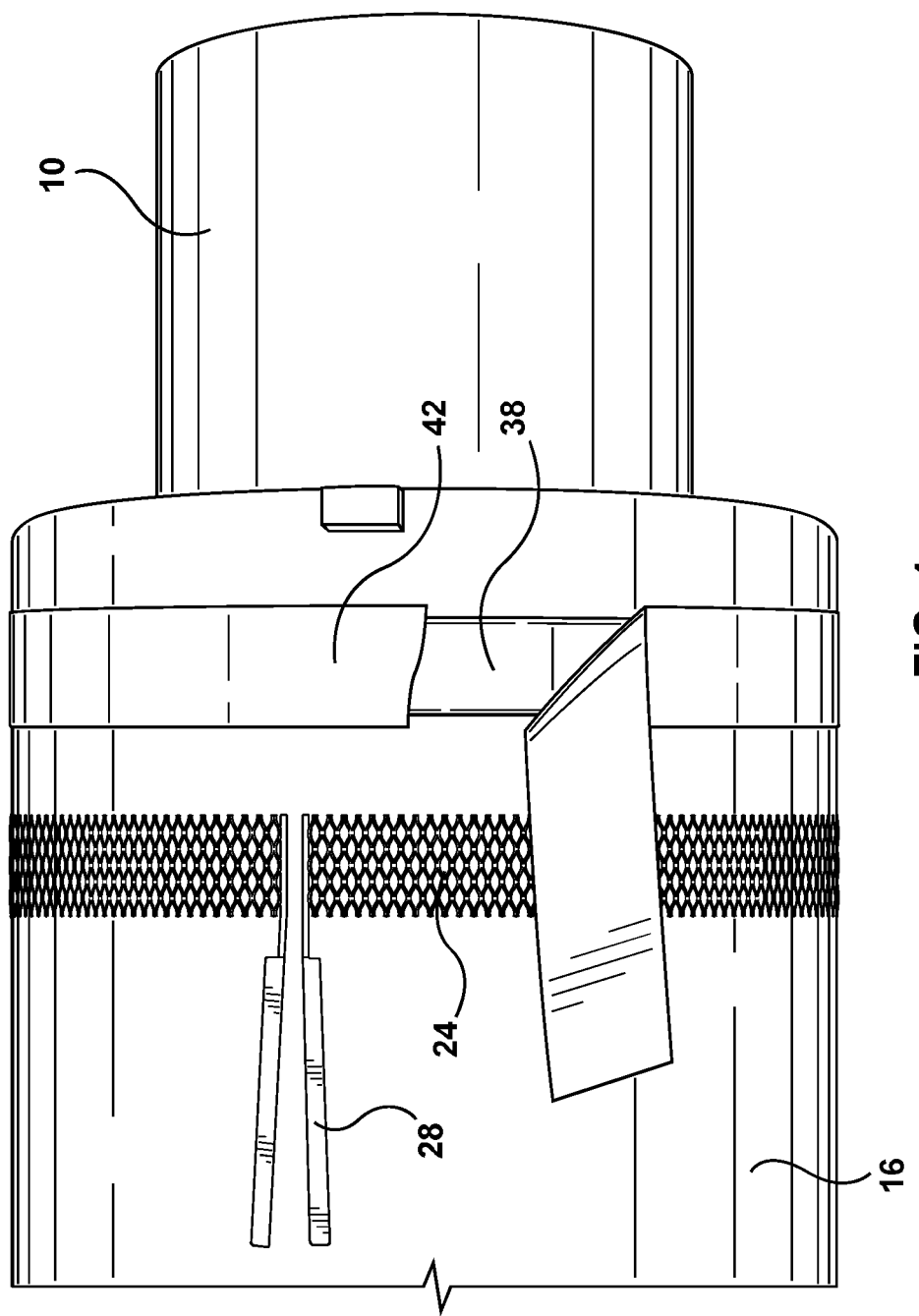
FIG. 4 shows a photograph of one end of a cut-back region according to one aspect of the present invention.

FIG. 4 shows a photograph of one end of a cut-back region in an alternative configuration of the embodiment shown at FIG. 3. Here, in contrast to the example shown in FIG. 3, the heating element 24 is distal to the cut-back region 22 in comparison to the adhesive strip 38. Note that adhesive strip 38 has backing 42, which is removed immediately before or (preferably) immediately after the placing of the casing around the cut-back region, in order to prevent sand, dust, and other environmental impurities from attaching to and reducing the efficacy of the adhesive strip 38.

Figure 5:
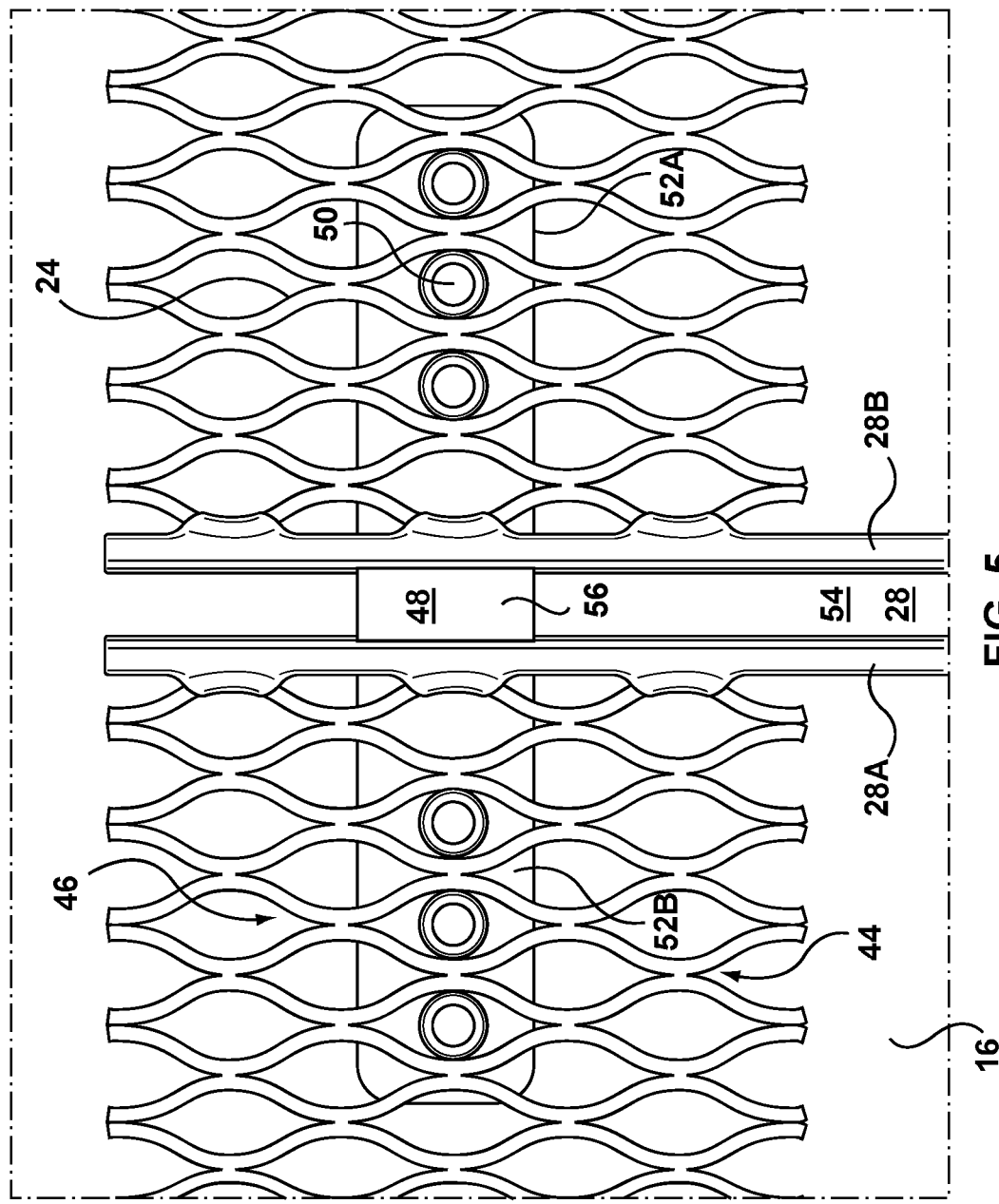
FIG. 5 shows a close-up view of a portion of a mesh heating element and lead according to one aspect of the present invention.

FIG. 5 shows a close-up view of a portion of a mesh heating element 24 and lead 28 of certain embodiments of the present invention. The heating element 24 wraps around the outer surface jacket 16 of the pipe. The heating element 24 is of a mesh configuration, having metal portions 44 and gaps 46. As would be appreciated to a person of skill in the art, lead 28 comprises two separate electrical leads 28A, 28B, and an electrical current is applied by connecting one of these to each of a positive and a negative terminal of an electrical source. It is necessary to have a sufficient gap 54 between leads 28A and 28B, to prevent short circuiting of the heating element. In previous electrofusion methods, the gap between the leads was estimated by the operator. This led to significant quality control issues—if the lead gap 54 between the leads 28A 28B was too large, there was potential for a gap in the electrofusion, and a resultant gap in the fusion interface between the outer surface layer 16 and the casing 36. This would allow ingress of water and/or air and a resultant deterioration of the insulating layer and corrosion of the metal pipe. If the lead gap 54 between the leads 28A 28B was too small, there was potential for a short circuiting of the heating element 24 resulting in poor or completely failed electrofusion, or a 'burn' or bubbling at the site of the leads, resulting in poor regional fusion. According to one aspect of the invention is therefore provided spacer 48. Spacer 48 comprises spacer region 56 which provides optimum lead gap 54 between leads 28A and 28B. Spacer also comprises tongues 52A and 52B which attach to a plurality of gaps 46 on either side of spacer region 56 utilizing buttons 50 which poke through gaps 46 and keep the spacer 48 in place. Spacer 48 is made of one piece of polymer, preferably polyethylene, of a type that is fusion compatible with both the outer surface layer 17 and the casing 36, and is designed to be disposable—like the heating element 24, after fusing, it is incorporated within the fused layers.

Figure 6:
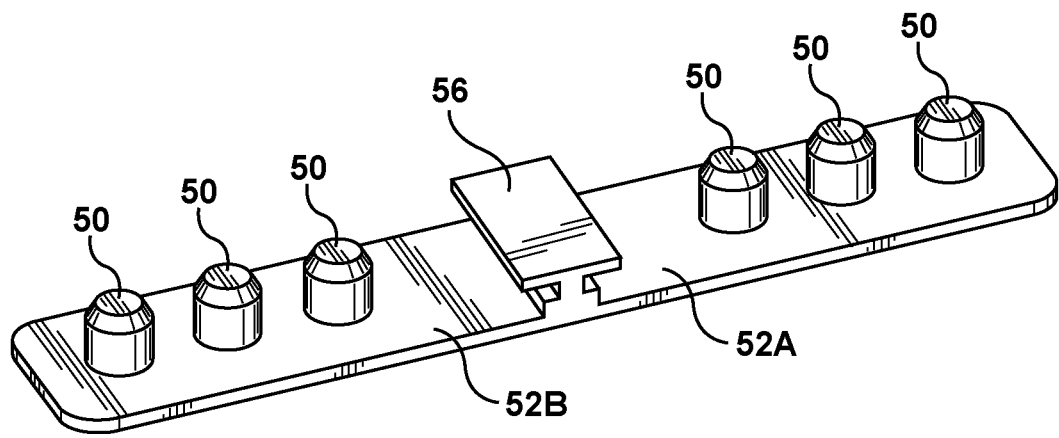
FIG. 6 shows a perspective view of a spacer according to one aspect of the present invention.

FIG. 6 shows a perspective view of spacer 48 comprising spacer gap 56, buttons 50, and tongues 52A, 52B. As can be seen, spacer gap 56, like buttons 50, extends above the thickness of the heating element 24 to designed to hold leads 28A 28B, and thus heating element 24, in place.

Figure 7:
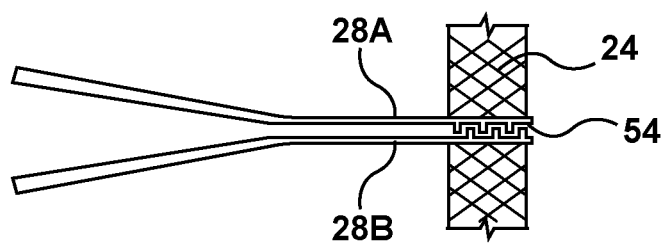
FIG. 7 shows a close-up of the lead region of the mesh heating element according to one aspect of the invention.

FIG. 7 shows a further embodiment of the invention, which may be combined in preferred embodiments with the spacer of FIG. 6, modified in configuration in a manner which would be evident to a person of skill in the art. FIG. 7 shows a close-up of the lead region comprising leads 28A, 28B of the heating element 24. Here, the lead region is configured in a labyrinth shape, to maximize the heated surface area at the lead gap 54. It has been found that labyrinth shaped lead region maximizes the heated surface area at the critical connections gap, thus maximizing the weldable surface area and improving the strength and reliability of the weld between the leads.

It has been known that the temperature attained when electrofusing is very important to the integrity of the process. If too low a temperature is utilized, the polymer will not melt sufficiently and thus will fail to provide a strong, sealed bond between the outer surface coating and the inner surface of the casing. Paradoxically, if too high a temperature is utilized, blistering, melting and dripping of the polymer, and other problems can also contribute to a failure to provide a strong, sealed bond between the outer surface coating and the inner surface of the casing. For this reason, prior art methods utilizing electrofusion have utilized either a disposable or a re-usable thermocouple to measure and control the temperature at the interface between the outer surface coating and the inner surface of the casing. A thin, rod-like thermocouple is inserted between these two layers, and readings are taken while the electrofusion takes place. In some embodiments, the thermocouple automatically controlled the current running through the heating elements, thus controlling the temperature at the interface.

It has been surprisingly found that the positioning of the thermocouple is critical. For example, the thermocouple readings at metal portions 44 will be different than thermocouple readings at gaps 46—sufficiently different that the strength of the electrofusion bond is affected. Using prior art systems and methods, it is virtually impossible to determine whether the thermocouple is reading at a metal portion 44 or at a gap 46, short of using an integrated, disposable thermocouple (which is undesirable and expensive) and, as a result, there was significant variation in overall heating temperature, and bond strength, from one electrofused casing to another.

Figure 8:
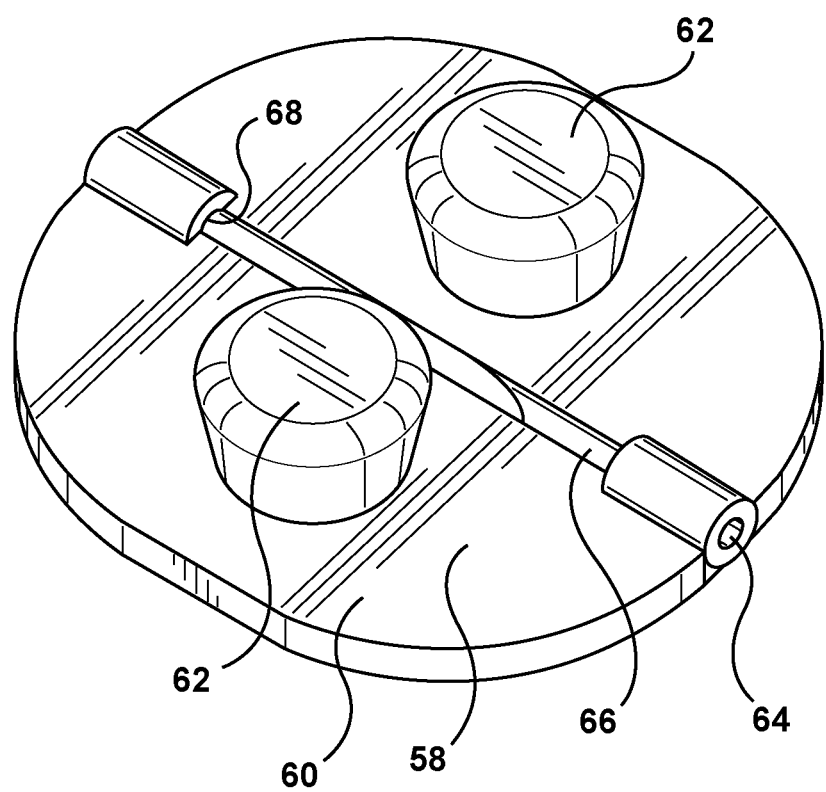
FIG. 8 shows a polyethylene insert according to one aspect of the invention.

Accordingly, provided as a further embodiment of the present invention, and as shown in FIG. 8, is a polyethylene insert for securing the re-usable thermocouple within the heating mesh element to better and more accurately control the temperature during a thermofusion welding process between the outer surface coating and the inner surface of the casing. The use of such an insert provides temperature reading accuracy similar to the accuracy achieved in systems with integrated thermocouples while allowing re-use of the thermocouple element, thus reducing the cost of the system.

Polyethylene insert 58 comprises backing 60 and buttons 62, which are of a size, shape and configuration to poke through gaps 46 in the heating element 24 mesh and hold the polyethylene insert 58 in place. Insert 58 also comprises aperture 64 and channel 66, both of a diameter designed to receive a standard and/or desired thermocouple probe (not shown). The thermocouple probe is inserted into aperture 64 and travels along channel 66, to provide accurate placement of the probe for a temperature reading at metal portion 44. Stopper 68 further positions the probe by prevention of movement beyond channel 66.

Polyethylene insert 58 is made of a material fusion-compatible with both outer surface coating and the inner surface of the casing, and is disposable in that it is melted and integrated within the fusion bond between the outer surface coating and the inner surface of the casing.

In prior art methods of electrofusing a casing onto a cut-back region of a pipe, it was found to be desirable to add pressure to the casing before initiating the electrofusion. Adding this pressure in the form of hoop stress was found to improve the strength and integrity of the electrofusion bond. This addition of hoop stress was through the use of a heat-shrinkable casing, which was heat shrunk to the outer surface coating. However, this heat shrink step sometimes would not provide sufficient hoop stress, resulting in incomplete or sub-optimal electrofusion. A second method habitually used to add such pressure to the casing was the use of clamps which surround the casing and apply pressure, pushing the casing and the outer surface coating together. Use of clamps works well, but requires heavy, cumbersome clamps. In addition, different clamp sizes are typically required for different sizes of pipe. A better option was desired.

According to an aspect of the present invention is provided a method for applying sufficient pressure to the casing to provide an improved electrofusion of the casing to the outer surface coating.

Surprisingly, it has been found that sufficient pressure application can be provided with an adhesive tape. Accordingly, provided is a method for providing sufficient pressure between the inner surface of the casing and the outer surface coating by applying wrap around, self-adhering tape, after heat shrinking the ends of the (heat shrinkable) casing. The tape generally conforms to the shape of the pipe, an advantage over previously known rigid mould systems, which often result in pressure gaps, and provides uniform distribution of pressure around the entire circumference of the pipe. In a preferred embodiment, the self adhering tape is a fiber mesh reinforced, paper backed tape, with an adhesive that provides stickiness at room temperature, and which stays adhesive to a temperature of at least approximately 240° C. In this manner, the tape does not disintegrate, nor does it dissociate from the casing, at electrofusion temperatures. In ideal embodiments, the tape has the properties of low expansion and low elongation at high temperature (240° C.) and the adhesive is non-flowing at the polyethylene welding temperature of 240° C.

The use of tape is also ideal in situations where the casing is cross-linked and not pre-stretched, or where the casing is not cross-linked.

Figure 9:
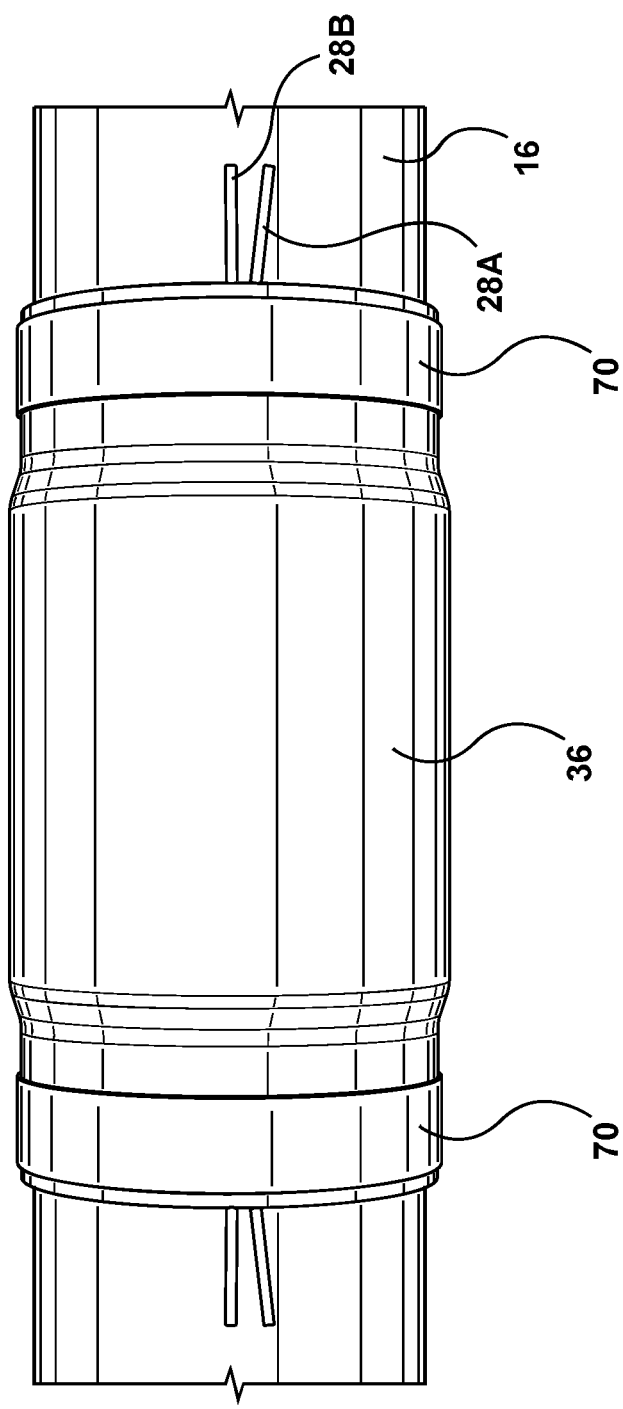
FIG. 9 shows a photograph of a casing clamped onto an outer surface layer of a pre-insulated pipe utilizing adhesive tape instead of a traditional clamp.

Tape 70 applied to the ends of a casing 36 applied onto a cut-back region of a pipe is shown in the photograph shown as FIG. 9.

It has also been found that running a pre-warm cycle, to normalize the temperature around the heating element 24, is desirable, immediately before the welding cycle is initiated. A pre-warming cycle normalizes the temperature around the circumference of the pipe, eliminating or decreasing undesirable temperature variations around the pipe.

Typically, the inner and outer layers of the casing member as well as the jacket material 46 comprise polyolefin, more typically polyethylene.

Thus, according to one embodiment of the invention is a method for attaching a casing 36 to a cut-back region 22 of a pipeline, wherein a casing 36 is disposed around the pipe joint, overlapping the ends of the outer surface jacket 16 on pipes 10 on either side of the cut-back region 22. Annular electrically heatable heating elements 24, 26 are disposed on the outer side of the outer surface jacket 16 in the overlap region.

Such heating elements 24, 26 are in themselves known for other purposes, and need not be described in detail herein.

The side portions of the casing 36 are pressure clamped to the outer surface jacket 16 by tightly wrapping tape 70 around them. The heating elements 24, 26 are then energized using power sources (not shown) connected to leads 28A, 28B to cause fusion bonding between the casing 36 and the outer surface jacket 16.

Following fusion bonding of the sides of the casing 36 to the outer surface jacket 16, the interior of the casing receives a precursor of a foam through a fill hole (not shown), and the foam is allowed to fully form and cure.

In an alternative embodiment, instead of utilizing the tape 70, the casing 36 has at least one heat shrinkable layer and the sides of the casing 36 are heat shrunk to the outer surface jacket 16 to create hoop stress at least equivalent in strength to the pressure provided by the tape 70.

In a further alternative embodiment, a strap (not shown) can be placed around the tape 70. The strap is narrower than the metal heating element 24, 26 and is generally elongation-resistant at the temperatures it is subjected to in the welding process. During the welding process by which the casing 36 is fused to the outer surface jacket 16, diameter of the casing 36, outer surface jacket 16, and/or tape 70 increases substantially. Since the strap is generally elongation-resistant, the diameter of the strap does not increase substantially during the welding process. This causes the polyolefin material of the outer surface jacket 16 and/or the casing 36 to be displaced from underneath the strap. Surprisingly, it has been found that such displacement—the actual movement of melted material—produces a higher quality weld than a wider strap system that extends beyond the edges of the heating elements. The amount of polyolefin displacement can be seen through ridges formed on both sides of the strap after completion of the welding process. Height and width of the ridges can be correlated to properties of the achieved weld.

The invention claimed is:

1. A method of attaching a heat shrinkable casing to an outer surface jacket of a pipeline at a pipe joint, comprising:
   a. wrapping or fitting the heat shrinkable casing around the pipe joint so that a side portion of the heat shrinkable casing overlaps an end portion of the outer surface jacket on either side of the pipe joint, to form an interface region on each side of the pipe joint, said interface region defined as being between the end portion of the outer surface jacket and the side portion of the heat shrinkable casing; said interface region, end portion, and/or side portion having an electric heating element around the pipe or heat shrinkable casing circumference;
   b. applying heat to at least said side portions to shrink the heat shrinkable casing or at least the side portions thereof;
   c. wrapping an adhesive tape around said side portions to provide pressure between the side portions and the end portions at the interface region;
   d. applying an electric current to said electric heating element of a sufficient energy to heat said electric heating element to a temperature sufficient to fuse said side portions to said end portions.

2. The method of claim 1 wherein the electric heating element is wrapped around the end portion of the outer surface jacket prior to wrapping or fitting the heat shrinkable casing around the pipe joint.

3. The method of claim 1 wherein the adhesive tape having an adhesive providing stickiness at room temperature and which stays adhesive to a temperature of at least about 240° C.

4. The method of claim 1, wherein, before the step of applying the electric current, a strap is fastened around the circumference of the interface region, on top of said tape and at a lateral location such that it lies on top of the electric heating element, said strap being narrower in width than said electric heating element and being generally elongation-resistant.

5. A method of attaching a casing to an outer surface jacket of a pipeline at a pipe joint, comprising:
   a. wrapping or fitting a casing around the pipe joint so that a side portion of the casing overlaps an end portion of the outer surface jacket on either side of the pipe joint, to form an interface region on each side of the pipe joint, said interface region defined as being between the end portion of the outer surface jacket and the side portion of the casing; said interface region, end portion, and/or side portion having both an electric heating element and an adhesive strip around its circumference, the adhesive strip disposed distal to the pipe joint relative to the electric heating element;
   b. applying an electric current to said electric heating element of a sufficient energy to heat said electric heating element to a temperature sufficient to fuse said side portions to said end portions.

6. The method of claim 5 further comprising, after step a) or after step b), applying heat to the side portion of the casing to melt the adhesive strip, resulting in a bonding of the outer surface jacket to the casing.

7. A method of attaching a casing to an outer surface jacket of a pipeline at a pipe joint, comprising:
   a. wrapping or fitting a casing around the pipe joint so that a side portion of the casing overlaps an end portion of the outer surface jacket on either side of the pipe joint, to form an interface region on each side of the pipe joint, said interface region defined as being between the end portion of the outer surface jacket and the side portion of the casing; said interface region, end portion, and/or side portion having an electric heating element around its circumference;
   b. applying a first electric current to said electric heating element, said first electric current of insufficient energy to fuse said side portions to said end portions, but of sufficient energy to warm and render more uniform a temperature of the heating element;
   c. applying a second electric current to said electric heating element of a sufficient energy to heat said electric heating element to a temperature sufficient to fuse said side portions to said end portions; wherein, before the step of applying the electric current, a strap is fastened around the circumference of the interface region, at a lateral location such that it lies on top of the electric heating element, said strap being narrower in width than said electric heating element and being generally elongation-resistant.

8. The method of claim 5, wherein, before the step of applying the electric current, a strap is fastened around the circumference of the interface region, at a lateral location such that it lies on top of the electric heating element, said strap being narrower in width than said electric heating element and being generally elongation-resistant.

9. The method of claim 2, wherein, before the step of applying the electric current, a strap is fastened around the circumference of the interface region, on top of said adhesive tape and at a lateral location such that it lies on top of the electric heating element, said strap being narrower in width than said electric heating element and being generally elongation-resistant.

10. The method of claim 3, wherein, before the step of applying the electric current, a strap is fastened around the circumference of the interface region, on top of said adhesive tape and at a lateral location such that it lies on top of the electric heating element, said strap being narrower in width than said electric heating element and being generally elongation-resistant.

11. The method of claim 6, wherein, before the step of applying the electric current, a strap is fastened around the circumference of the interface region, at a lateral location such that it lies on top of the electric heating element, said strap being narrower in width than said electric heating element and being generally elongation-resistant.

* * * * *